United States Patent
Do et al.

(10) Patent No.: US 9,525,170 B2
(45) Date of Patent: Dec. 20, 2016

(54) NEGATIVE ACTIVE MATERIAL AND LITHIUM BATTERY INCLUDING NEGATIVE ACTIVE MATERIAL

(75) Inventors: Ui-Song Do, Yongin-si (KR); Chang-Su Shin, Yongin-si (KR); So-Ra Lee, Yongin-si (KR); Beom-Kwon Kim, Yongin-si (KR); Jae-Myung Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 354 days.

(21) Appl. No.: 13/566,488

(22) Filed: Aug. 3, 2012

(65) Prior Publication Data

US 2013/0209881 A1  Aug. 15, 2013

(30) Foreign Application Priority Data

Feb. 13, 2012  (KR) .................. 10-2012-0014389

(51) Int. Cl.
*H01M 4/587* (2010.01)
*H01M 4/38* (2006.01)
*H01M 4/40* (2006.01)
*H01M 4/48* (2010.01)
*H01M 4/60* (2006.01)
*B82Y 30/00* (2011.01)
(Continued)

(52) U.S. Cl.
CPC .............. *H01M 4/386* (2013.01); *B82Y 30/00* (2013.01); *H01M 4/134* (2013.01); *H01M 4/1395* (2013.01); *H01M 4/366* (2013.01); *H01M 4/625* (2013.01); *H01M 10/052* (2013.01); *Y02E 60/122* (2013.01); *Y02T 10/7011* (2013.01)

(58) Field of Classification Search
None
See application file for complete search history.

(56) References Cited

U.S. PATENT DOCUMENTS 7,037,581 B2    5/2006  Aramata et al.
2002/0164479 A1* 11/2002 Matsubara et al. ........... 428/367
(Continued)

FOREIGN PATENT DOCUMENTS

JP        3952180 B2      5/2007
KR     2007-0113066 A1   11/2007
KR    10-2009-0078591 A   7/2009

OTHER PUBLICATIONS

DaNa 2.0, "Carbon Black—Material Information," Data and Knowledge of Nanomaterials, "http://nanopartikel.info/en/nanoinfo/materials/carbon-black/material-information".*
(Continued)

*Primary Examiner* — Ula C Ruddock
*Assistant Examiner* — Matthew Van Oudenaren
(74) *Attorney, Agent, or Firm* — Robert E. Bushnell, Esq.

(57) ABSTRACT

A negative active material and a lithium battery including the negative active material. The negative active material includes a non-carbonaceous nanoparticle capable of doping or undoping lithium; and a crystalline carbonaceous nano-sheet, wherein at least one of the non-carbonaceous nanoparticle and the crystalline carbonaceous nano-sheet includes a first amorphous carbonaceous coating layer on its surface, and thus an electrical conductivity thereof is improved. In addition, a lithium battery including the negative active material has an improved efficiency and lifetime.

17 Claims, 5 Drawing Sheets

(51) Int. Cl.
     *H01M 4/134*      (2010.01)
     *H01M 4/1395*     (2010.01)
     *H01M 4/36*       (2006.01)
     *H01M 4/62*       (2006.01)
     *H01M 10/052*     (2010.01)

(56) References Cited

U.S. PATENT DOCUMENTS

| | | | |
|---|---|---|---|
| 2005/0233213 A1* | 10/2005 | Lee et al. | 429/218.1 |
| 2008/0113271 A1* | 5/2008 | Ueda et al. | 429/231.95 |
| 2009/0117467 A1* | 5/2009 | Zhamu | H01M 4/133 |
| | | | 429/231.8 |
| 2010/0273058 A1 | 10/2010 | Lee et al. | |
| 2011/0183202 A1* | 7/2011 | Lee et al. | 429/212 |
| 2011/0195308 A1 | 8/2011 | Lee et al. | |
| 2011/0274970 A1 | 11/2011 | Lee et al. | |
| 2012/0064409 A1* | 3/2012 | Zhamu | B82Y 30/00 |
| | | | 429/221 |

OTHER PUBLICATIONS

Zhang et al., "Carbon-coated SnO2/graphene nanosheets as highly reversible anode materials for lithium ion batteries," Available Online Dec. 29, 2011, Carbon, vol. 50, pp. 1897-1903.*

Ng et al., "Amorphous Carbon-Coated Silicon Nanocomposites: A Low-Temperature Synthesis via Spray Pyrolysis and Their Application as High-Capacity Anodes for Lithium-Ion Batteries," 2007, Journal of Physical Chemistry, 111, 11131-11138.*

* cited by examiner

NEGATIVE ACTIVE MATERIAL AND LITHIUM BATTERY INCLUDING NEGATIVE ACTIVE MATERIAL

CLAIM OF PRIORITY

This application makes reference to, incorporates the same herein, and claims all benefits accruing under 35 U.S.C. §119 from an application earlier filed in the Korean Intellectual Property Office on the 13 of Feb. 2012 and there duly assigned Serial No. 10-2012-0014389.

BACKGROUND OF THE INVENTION

Field of the Invention

One or more embodiments of the present invention relate to a negative active material and a lithium battery including the negative active material.

Description of the Related Art

Lithium secondary batteries used in portable electronic devices for information communication, such as PDAs, mobile phones, notebook computers, and the like, electric bicycles, and electric vehicles exhibit a discharge voltage that is twice or more than that of general batteries, and thus may have a high energy density.

Lithium secondary batteries include a positive electrode and a negative electrode that include an active material that allows intercalation and deintercalation of lithium ions, and an organic electrolyte or a polymer electrolyte interposed therebetween. Such lithium secondary batteries generate electric energy according to an oxidation/reduction reaction occurring when lithium ions are intercalated/deintercalated in the positive and negative electrodes.

Positive active materials of lithium secondary batteries may be oxides of lithium and a transition metal that allow intercalation Of lithium ions, such as a lithium cobalt oxide ($LiCoO_2$), a lithium nickel oxide ($LiNiO_2$), and a lithium nickel cobalt manganese oxide (e.g., $Li[NiCoMn]O_2$, $Li[Ni_{1-x-y}Co_xM_y]O_2$).

Research into negative active materials that allow intercalation and deintercalation of lithium ions, such as various types of carbonaceous materials including artificial and natural graphite and hard carbon and non-carbonaceous materials such as Si, has been conducted.

Such non-carbonaceous materials exhibit a very high capacity density at least ten times that of graphite. However, due to volumetric expansion and contraction of a non-carbonaceous material during charging and discharging of a lithium battery, the lithium battery may have a low capacity retention ratio, a low charge/discharge efficiency, and a decreased lifetime. Therefore, there is a need to develop a high-performance negative active material with enhanced capacity and cycle lifetime characteristics.

SUMMARY OF THE INVENTION

One or more embodiments of the present invention include an improved negative active material with an enhanced lifetime.

One or more embodiments of the present invention include a lithium battery including the negative active material.

Additional aspects will be set forth in part in the description which follows and, in part, will be apparent from the description, or may be learned by practice of the presented embodiments.

According to one or more embodiments of the present invention, a negative active material includes a non-carbonaceous nanoparticle capable of doping or undoping lithium; and a crystalline carbonaceous nano-sheet. At least one of the non-carbonaceous nanoparticle and the crystalline carbonaceous nano-sheet includes a first amorphous carbonaceous coating layer on the surface of the at least one of the non-carbonaceous nanoparticle and the crystalline carbonaceous nano-sheet.

The non-carbonaceous nanoparticle may be nanoparticles of a material selected from Si; $SiO_x$ where $0<x\leq2$; Si—Z alloy where Z is an alkali metal, an alkali earth metal, a Group XIII element, a Group XIV element, a transition metal, a rare-earth element, or combinations thereof and is not Si; Sn; $SnO_2$; Sn—Z where Z is an alkali metal, alkali earth metal, a Group XIII element, a Group XIV element, a transition metal, a rare-earth element, and combinations thereof and is not Sn; and combinations thereof.

The non-carbonaceous nanoparticle may have an average diameter in a range of about 1 nm to about 500 nm.

The crystalline carbonaceous nano-sheet may be a material selected from a polycyclic nano-sheet in which rings of carbon atoms fused to. one another are arranged on a plane, a lamination of polycyclic nano-sheets, and combinations thereof.

The crystalline carbonaceous nano-sheet may have an average area in a range of about 1 $\mu m^2$ to about 100 $\mu m^2$.

A thickness of the crystalline carbonaceous nano-sheet may be in a range of about 0.1 nm to about 50 nm.

The crystalline carbonaceous nano-sheet may have a thickness of 20 nm or less and an aspect ratio of 300 or more.

An amount of the crystalline carbonaceous nano-sheet may be in a range of about 1 to about 300 parts by weight based on 100 parts by weight of the non-carbonaceous nanoparticles.

The first amorphous carbonaceous coating layer may include a material selected from soft carbon, hard carbon, a pitch carbide, a meso-phase pitch carbide, sintered coke, a polymer carbide, and combinations thereof.

A thickness of the first amorphous carbonaceous coating layer may be in a range of about 1 nm to about 1 82 m.

A size of the negative active material may be in a range of about 1 μm to about 60 μm.

The negative active material may further include a second amorphous carbonaceous coating layer on its surface.

The second amorphous carbonaceous coating layer may include a material selected from soft carbon, hard carbon, a pitch carbide, a meso-phase pitch carbide, sintered coke, a polymer carbide, and combinations thereof.

A thickness of the second amorphous carbonaceous coating layer may be in a range of about 1 nm to about 1 μm.

According to one or more embodiments of the present invention, a lithium battery includes a negative electrode including the negative active material described above; a positive electrode including a positive active material and facing the negative electrode; and an electrolyte disposed between the negative electrode and the positive electrode.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
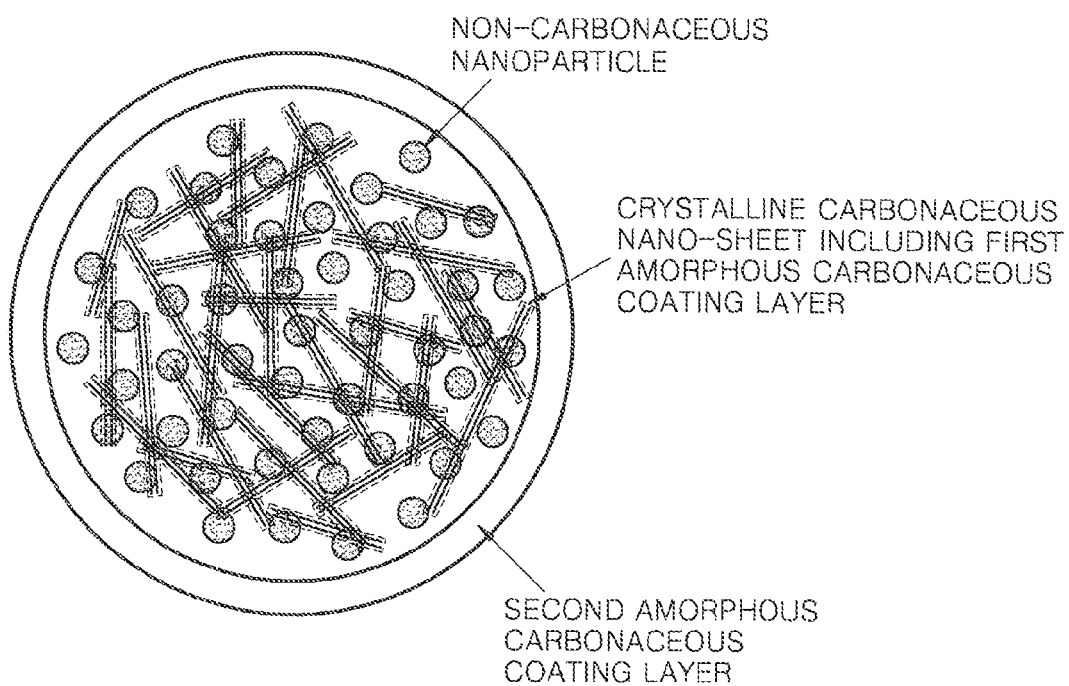
FIG. 1 is a diagram illustrating a structure of a negative active material constructed as an embodiment in accordance with the principles of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, exemplary embodiments of a negative active material and a lithium battery including the negative active material will be described in further detail with reference to the accompanying drawings.

According to an embodiment of the present invention, a negative active material includes a non-carbonaceous nanoparticle capable of doping or undoping lithium; and a crystalline carbonaceous nano-sheet, wherein at least one of the non-carbonaceous nanoparticle and the crystalline carbonaceous nano-sheet includes a first amorphous carbonaceous coating layer on its surface.

Since the negative active material includes the first amorphous carbonaceous coating layer on a surface of the non-carbonaceous nanoparticle and/or the crystalline carbonaceous nano-sheet, the conductivity of lithium ions that migrate into the negative active material is improved, whereby a lithium battery including the negative active material may have an improved efficiency and lifetime.

The non-carbonaceous nanoparticle is not particularly limited as long as it is capable of doping or undoping lithium and has high capacity as a negative active material for a lithium battery. The term "non-carbonaceous" as used herein is interpreted that at least 50 wt % of the non-carbonaceous material is not carbonaceous. For example, the non-carbonaceous nanoparticles may include at least about 60 wt %, about 70 wt %, about 80 wt %, or about 90 wt % of a non-carbonaceous material, or may include about 100 wt % of a non-carbonaceous material.

Examples of a material for doping or undoping lithium, which may be used as the non-carbonaceous nanoparticle, include Si; $SiO_x$ where $0<x\leq2$; Si—Z alloy where Z is an alkali metal, an alkali earth metal, a Group XIII element, a Group XIV element, a transition metal, a rare-earth element, and combinations thereof and is not Si; Sn; $SnO_2$; and Sn—Z where Z is an alkali metal, alkali earth metal, a Group XIII element, a Group XIV element, a transition metal, a rare-earth element, and combinations thereof and is not Sn. Also, at least one of the materials for doping or undoping lithium may be used in combination with $SiO_2$. The element Z may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or combinations thereof. The non-carbonaceous nanoparticles may be used alone or in combination of at least two of these materials.

According to one embodiment, the non-carbonaceous nanoparticle may be a silicon-based nanoparticle such as Si, SiO, where $0<x\leq2$, or a Si—Z alloy wherein Z is an alkali metal, an alkali earth metal, a Group XIII element, a Group XIV element, a transition metal, a rare earth element, or a combination thereof; however, Z is not Si. The silicon-based nanoparticle may be an amorphous silicon nanoparticle, a crystalline silicon nanoparticle (including monocrystalline and polycrystalline), or mixtures thereof. The silicon-based nanoparticle may be used alone or in combination of at least two of the silicon-based nanoparticle. For example, a silicon oxide such as $SiO_x$ where $0<x\leq2$ may be used as the silicon-based nanoparticle since it has a low expansion coefficient during charging and discharging.

An average diameter of the non-carbonaceous nanoparticle is not particularly limited, and may be on the scale of nanometers, for example, 500 nm or less. For example, the non-carbonaceous nanoparticle may have an average diameter ranging from about 1 to about 500 nm, for example, from about 50 to about 150 nm, for example, from about 90 to about 110 nm.

The crystalline carbonaceous nano-sheet includes a carbonaceous material having a crystalline sheet structure. The term "sheet structure" used herein refers to a structure that is, based on 2-dimensional shape, curved, curled, or partially defected. In addition, the term "carbonaceous" used herein is interpreted that at least about 50 wt % of the carbonaceous material is carbon. For example, the crystalline carbonaceous nano-sheets may include at least about 60 wt %, about 70 wt %, about 80 wt %, or about 90 wt % of carbon, or may include about 100 wt % of carbon.

A crystal structure of the crystalline carbonaceous nano-sheet is not particularly limited as long as it enables reversible intercalation/deintercalation of lithium ions. For example, in the crystalline carbonaceous nano-sheet, an interlayer spacing (d002) of a (002) plane by X-ray diffraction may be equal to or greater than about 0.333 nm and less than about 0.339 nm, for example, equal to or greater than about 0.335 nm and less than about 0.339 nm, or equal to or greater than about 0.337 nm and equal to or less than about 0.338 nm.

The crystalline carbonaceous nano-sheet may be, for example, a polycyclic nano-sheet in which rings formed by connecting six carbon atoms in a hexagonal shape are polymerized to each other and arrayed on one plane. For example, the polycyclic nano-sheet may be a graphene. The Graphene refers to a single layer of graphite. In addition, the crystalline carbonaceous nano-sheet may include a lamination of the polycyclic nano-sheets, for example, a structure in which 2 to 50 polycyclic nano-sheets are laminated along a vertical direction.

The polycyclic nano-sheet or the lamination thereof may be obtained by exfoliating or separating a graphene sheet from grahite such as natural graphite. or artificial graphite.

Alternatively, the polycyclic nano-sheet or the lamination thereof may be obtained by ultrasonically treating an expanded graphite to form into nano-sheets. Here, the expanded graphite is a material obtained by intercalating chemicals such as acid or alkali into the interlayer of graphite and heating the resulting graphite to inflate a vertical layer of molecular structures. The crystalline carbonaceous nano-sheet may be used alone or in combination of at least two kinds of crystalline carbonaceous nano-sheets.

In one embodiment, the thickness of the crystalline carbonaceous nano-sheet may be 50 nm or less. For example, the thickness of the crystalline carbonaceous nano-sheet may be in the range of about 0.1 to about 50 nm, for example, about 5 to about 20 nm. In addition, the crystalline carbonaceous nano-sheet may have an average area in the range of about 1 to about 100 $\mu m^2$.

For example, the crystalline carbonaceous nano-sheet having a thickness of 20 nm or less and an aspect ratio of 300 or more may be used.

The crystalline carbonaceous nano-sheet has a large specific surface area and is flexible, and thus, may cover a lot of pores between the non-carbonaceous nanoparticles, and provide a conductive path between the non-carbonaceous nanoparticles, thereby improving an electrical conductivity of the negative active material. In addition, the crystalline carbonaceous nano-sheet may have an inhibiting effect on a change in volume of the non-carbonaceous nanoparticle during charging and discharging.

If the amount of the crystalline carbonaceous nano-sheet is too large, a relative ratio of the amount of the non-carbonaceous nanoparticle, which exhibits high capacity, to the amount of the crystalline carbonaceous nano-sheet decreases, resulting in reduced capacity. On the other hand, if the amount of the crystalline carbonaceous nano-sheet is too small, the inhibiting effect thereof on volumetric expansion of the non-carbonaceous nanoparticle or its effect on improving an electrical conductivity of the negative active material may be insufficient. In an embodiment, the amount of the crystalline carbonaceous nano-sheet may be in the range of about 1 to about 300 parts by weight based on 100 parts by weight of the non-carbonaceous nanoparticle. For example, the amount of the crystalline carbonaceous nano-sheet may be in the range of about 10 to about 200 parts by weight, for example, about 50 to about 150 parts by weight, based on 100 parts by weight of the non-carbonaceous nanoparticle.

At least one of the non-carbonaceous nanoparticle and the crystalline carbonaceous nano-sheet includes a first amorphous carbonaceous coating layer on its surface. The term "amorphous" refers to a case in which a distinctive crystal structure is not present. The amorphous carbonaceous coating layer may include, for example, at least about 50 wt %, about 60 wt %, about 70 wt %, about 80 wt %, or about 90 wt % of amorphous carbon, or may include about 100 wt % of amorphous carbon. The first amorphous carbonaceous coating layer may enhance adhesive strength between the non-carbonaceous nanoparticle and the crystalline carbonaceous nano-sheet and provide a conductive path to the non-carbonaceous nanoparticle and/or the crystalline carbonaceous nano-sheet, thereby improving an electrical conductivity and an ionic conductivity of the negative active material.

In one embodiment, the first amorphous carbonaceous coating layer may be formed on a surface of the non-carbonaceous nanoparticle, a surface of the crystalline carbonaceous nano-sheet, or surfaces of both of them. The first amorphous carbonaceous coating layer may be partially or completely coated on a surface of the non-carbonaceous nanoparticle and/or the crystalline carbonaceous nano-sheet.

For example, the first amorphous carbonaceous coating layer may be coated on at least about 50 area %, about 60 area %, about 70 area %, about 80 area %, or about 90 area % of the entire surface to be coatable.

In an embodiment, the first amorphous carbonaceous coating layer may include a material selected from soft carbon, hard carbon, a pitch carbide, a meso-phase pitch carbide, sintered coke, a polymer carbide, and combinations thereof.

A coating method for the first amorphous carbonaceous coating layer may be, but is not limited to, dry coating or liquid coating. Examples of the dry coating are deposition, chemical vapor deposition (CVD), and the like, and examples of the liquid coating are impregnation, spraying, and the like. For example, the non-carbonaceous nanoparticle and/or the crystalline carbonaceous nano-sheet may be coated with a carbon precursor, such as a coal-based pitch, a mesophase pitch, a petroleum-based pitch, a coal-based oil, a petroleum-based crude oil, an organic synthetic pitch, or a polymer resin, such as a phenol resin, a furan resin, a polyimide resin, or the like, followed by heat treating to form the first amorphous carbonaceous coating layer.

The thickness of the first amorphous carbonaceous coating layer may be uniformly or not uniformly formed. For example, the thickness of the first amorphous carbonaceous coating layer may be in the range of about 1 nm to about 1 $\mu m$, for example, about 5 to about 100 nm, but is not limited thereto.

In one embodiment, the negative active material including the non-carbonaceous nanoparticle and the crystalline carbonaceous nano-sheet may be spherized to form a primary particle having a spherical shape. In this regard, the primary particle may have a pore formed therein. The pore present inside the primary particle of the negative active material may contribute to a decrease in volumetric expansion of non-carbonaceous nanoparticle. The primary particle may have a porosity of about 5 to about 30%, for example, about 10 to about 20%, based on a total volume of the primary particle. Due to the pore formed in the primary particle, the primary particle may have a composite layered structure of the non-carbonaceous nanoparticle and the crystalline carbonaceous nano-sheet.

An average diameter of the negative active material is not particularly limited. However, if the average diameter of the negative active material is too small, reactivity with an electrolytic solution is too high and thus cycle characteristics of a formed lithium battery may be degraded. On the other hand, if the average diameter of the negative active material is too large, dispersion stability in preparing a negative electrode slurry is decreased and a formed negative electrode may have a rough surface. For example, an average diameter of the negative active material may be in the range of about 1 to about 60 $\mu m$. For example, the average diameter of the negative active material may be in the range of about 1 to about 30 $\mu m$, for example, about 5 to about 25 $\mu m$, for example, about 10 to about 20 $\mu m$.

In an embodiment, the negative active material may further include a second amorphous carbonaceous coating layer on its surface. The second amorphous carbonaceous coating layer may include a material selected from soft carbon, hard carbon, a pitch carbide, a meso-phase pitch carbide, sintered coke, a polymer carbide, and combinations thereof, as in the first amorphous carbonaceous coating layer.

A coating method of the second amorphous carbonaceous coating layer may be the same method as that used for the first amorphous carbonaceous coating layer, for example, dry coating or liquid coating. For example, the primary particle may be coated with a carbon precursor, such as a coal-based pitch, a mesophase pitch, a petroleum-based pitch, a coal-based oil, a petroleum-based crude oil, an organic synthetic pitch, or a polymer resin, such as a phenol resin, a furan resin, a polyimide resin, or the like, followed by heat treating to form the second amorphous carbonaceous coating layer.

The second amorphous carbonaceous coating layer may be formed in such a thickness that the second amorphous carbonaceous coating layer provides a sufficient conductive path between primary particles without a decrease in battery capacity. For example, the thickness of the second amorphous carbonaceous coating layer may be in the range of about 1 nm to about 1 μm, for example, about 5 to about 100 nm, but is not limited thereto.

The amount of the second amorphous carbonaceous coating layer may be in the range of about 0.1 to about 30 wt % based on the primary particle. For example, the amount of the second amorphous carbonaceous coating layer may be in the range of about 1 to about 25 wt %, for example, about 5 to about 25 wt %, based on the primary particle.

In an embodiment, the primary particle may be agglomerated or combined with each other to form a secondary particle, or may be combined with other active components to form a secondary particle.

Figure 2:
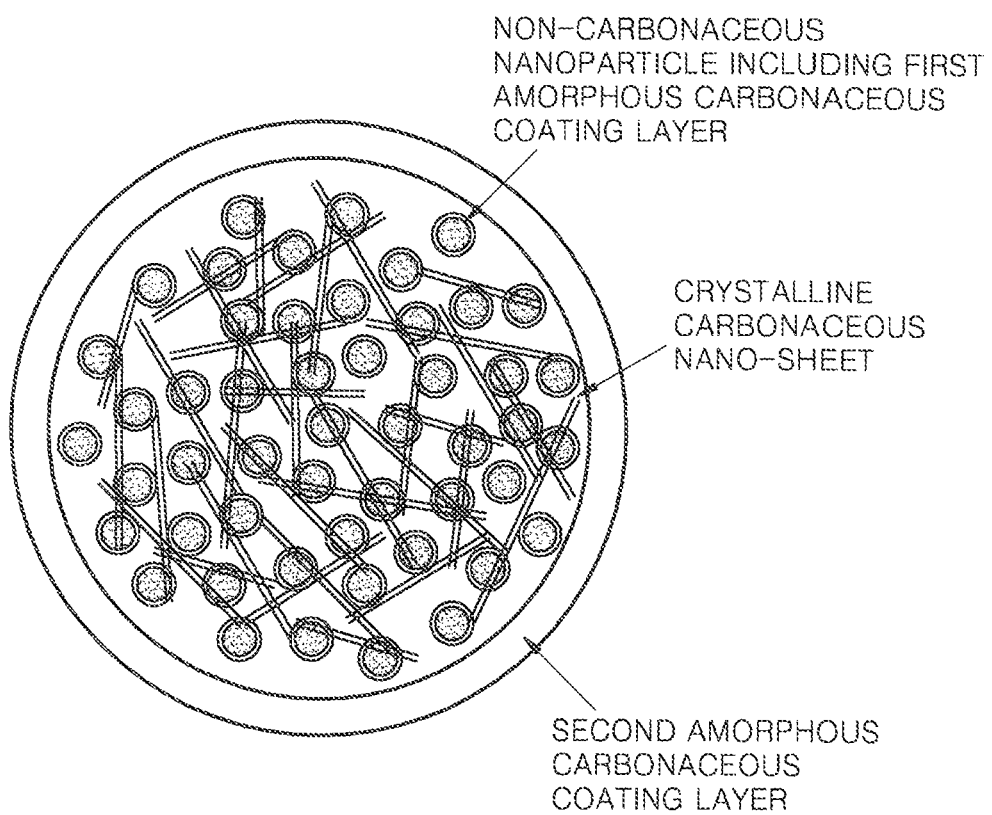
FIG. 2 is a diagram illustrating a structure of a negative active material constructed as another embodiment in accordance with the principles of the present invention.

FIG. 1 is a diagram illustrating a structure of a negative active material according to an embodiment of the present invention. FIG. 2 is a diagram illustrating a structure of a negative active material according to another embodiment of the present invention.

As shown in FIG. 1, the negative active material may include an amorphous carbonaceous coating layer such as a pitch coating layer on a surface of a crystalline carbonaceous nano-sheet. As shown in FIG. 2, the negative active material may include an amorphous carbonaceous coating layer on a surface of a non-carbonaceous nanoparticle. Also, the negative active material may include an amorphous carbonaceous coating layer on surfaces of both of them.

According to another embodiment of the present invention, a lithium battery includes a negative electrode including the negative active material described above, a positive electrode including a positive active material and facing the negative electrode, and an electrolyte interposed between the negative electrode and the positive electrode.

The negative electrode includes the negative active material described above and may be prepared by adding the negative active material described above, a binder, and a conductive material (selectively used) to a solvent and mixing the solution to prepare a negative active material composition, and then forming the negative active material composition into a certain shape, or coating a current collector such as a copper foil with the negative active material composition.

The binder included in the negative active material composition is a component assisting in binding the negative active material and the conductive material to each other, and in binding the negative active material and the current collector to each other, and the amount of the binder may be in the range of about 1 to about 20 parts by weight based on 100 parts by weight of the negative active material. Examples of the binder include polyvinylidene fluoride, polyvinyl alcohols, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluoro rubber, and various copolymers.

The conductive material is not necessarily used in preparation of the negative active material because the negative active material described above includes carbonaceous nano-sheets that provide a conductive path, or the conductive material may be selectively used to increase the electrical conductivity of the negative active material. The conductive material may be any material used in general lithium batteries. Examples of the conductive material include carbonaceous materials such as carbon blacks, acetylene black, Ketjen black, and carbon fibers; metallic materials such as powders or fibers of metal such as copper, nickel, aluminum, and silver; conductive polymers such as polyphenylene derivatives; and mixtures thereof. The amount of the conductive material may be appropriately adjusted.

Examples of the solvent include N-methylpyrrolidone (NMP), acetone, water, and the like. The amount of the solvent may be in the range of about 1 to about 10 parts by weight based on 100 parts by weight of the negative active material. When the amount of the solvent is within this range, a process of forming a negative active material layer is easily performed.

In addition, the current collector is generally fabricated to have a thickness in the range of about 3 to about 500 μm. The current collector is not particularly limited, and may be any material as long as it has suitable conductivity and does not cause chemical changes in the fabricated battery. Examples of the current collector include copper, stainless steel, aluminum, nickel, titanium, sintered carbon, copper or stainless steel that is surface-treated with carbon, nickel, titanium or silver, and aluminum-cadmium alloys. In addition, the current collector may be processed to have fine irregularities on surfaces thereof so as to enhance adhesive strength of the current collector to the negative active material, and may be used in any of various forms including films, sheets, foils, nets, porous structures, foams, and non-woven fabrics.

The negative active material composition may be directly coated on the current collector to manufacture a negative electrode plate. Alternatively, the negative electrode plate may be manufactured by casting the negative active material composition on a separate support to form a negative active material film, separating the negative active material film from the support, and laminating the negative active material film on a copper foil current collector. The negative electrode is not limited to the examples described above, and may be in other forms.

Alternatively, the negative active material composition may be printed on a flexible electrode substrate to manufacture a printable battery.

Separately, to fabricate the positive electrode, a positive active material, a conductive material, a binder, and a solvent are mixed together to prepare a positive active material composition.

Any lithium-containing metal oxide that is commonly used in the art may be used as the positive active material. Examples of the lithium-containing metal oxide include $LiCoO_2$, $LiMn_xO_{2x}$ where x=1 or 2, $LiNi_{1-x}Mn_xO_2$ where $0<x<1$, and $LiNi_{1-x-y}Co_xMn_yO_2$ where $0 \leq x \leq 0.5$ and $0 \leq y \leq 0.5$. For example, compounds that allow intercalation and deintercalation of lithium ions, such as $LiMn_2O_4$, $LiCoO_2$, $LiNiO_2$, $LiFeO_2$, $V_2O_5$, TiS, MoS, and the like may be used.

The conductive material, the binder, and the solvent used in the negative active material composition described above may also be used in the positive active material composition. If required, a plasticizer may be added to each of the positive material composition and the negative material composition to form pores inside electrode plates thereof. In this regard, the amounts of the positive active material, the conductive material, the binder, and the solvent may be the same as those used in a general lithium battery.

A positive electrode current collector is fabricated to have a thickness in a range of about 3 to about 500 μm, and may be any current collector as long as it has high conductivity and does not cause chemical changes in the fabricated battery. Examples of the positive electrode current collector include stainless steel, aluminum, nickel, titanium, sintered carbon, and aluminum or stainless steel that is surface-treated with carbon, nickel, titanium, or silver. The positive electrode current collector is processed to form fine irregularities on surfaces thereof so as to enhance adhesive strength of the current collector to the positive active material, and may be used in any of various forms including films, sheets, foils, nets, porous structures, foams, and non-woven fabrics.

The positive active material composition is directly coated on the positive electrode current collector and dried to prepare a positive electrode plate. Alternatively, the positive active material composition may be cast on a separate support to form a positive active material film, and then the positive active material film may be separated from the support and laminated on the positive electrode current collector to prepare the positive electrode plate.

The positive electrode and the negative electrode may be separated from each other by a separator. Any separator that is commonly used in lithium batteries may be used. In particular, the separator may have a low resistance to migration of ions in an electrolyte and have a high electrolyte-retaining ability. Examples of the separator may include glass fiber, polyester, Teflon, polyethylene, polypropylene, polytetrafluoroethylene (PTFE), and combinations thereof, each of which may be a nonwoven fabric or a woven fabric. The separator has a pore diameter in the range of about 0.01 to about 10 μm and a thickness in the range of about 10 to about 30 μm.

A lithium salt-containing non-aqueous electrolyte is composed of a non-aqueous electrolyte and lithium. As the non-aqueous electrolyte, a non-aqueous electrolytic solution, an organic solid electrolyte, or an inorganic solid electrolyte may be used.

As the non-aqueous electrolytic solution, any of aprotic organic solvents such as N-methyl-2-pyrrolidone, propylene carbonate, ethylene carbonate, butylene carbonate, dimethyl carbonate, diethyl carbonate, gamma-butyro lactone, 1,2-dimethoxy ethane, tetrahydrofuran, 2-methyl tetrahydrofuran, dimethylsulfoxide, 1,3-dioxolane, formamide, dimethylformamide, acetonitrile, nitromethane, methyl formate, methyl acetate, phosphoric acid triester, trimethoxy methane, dioxolane derivatives, sulfolanes, methyl sulfolanes, 1,3-dimethyl-2-imidazolidinone, propylene carbonate derivatives, tetrahydrofuran derivatives, ethers, methyl propionate, and ethyl propionate may be used.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may be any lithium salt that is commonly used in a lithium battery, and that is soluble in the above-described lithium salt-containing non-aqueous electrolyte. For example, the lithium salt includes at least one selected from the group consisting of $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic carboxylic acid lithium, lithium tetraphenyl borate, and imide.

Lithium batteries may be classified into lithium ion batteries, lithium ion polymer batteries, and lithium polymer batteries according to types of a separator and electrolyte used therein. In addition, lithium batteries may be classified into a cylindrical type, a rectangular type, a coin type, and a pouch type according to battery shape, and may also be classified into a bulk type and a thin film type according to battery size. Lithium batteries may be used either as primary lithium batteries or secondary lithium batteries.

A method of manufacturing a lithium battery is widely known in the art, and a detailed description thereof will not be provided herein.

Figure 3:
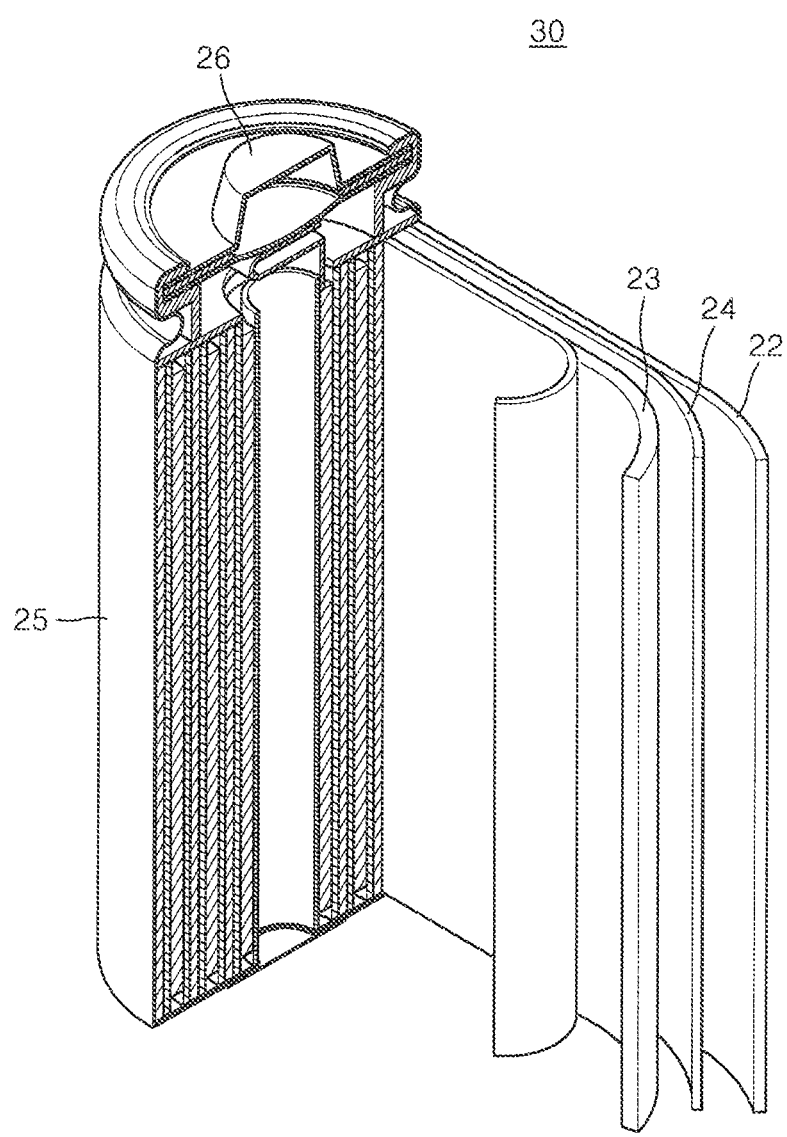
FIG. 3 is a schematic diagram illustrating a structure of a lithium battery constructed as an embodiment in accordance with the principles of the present invention.

FIG. 3 is a schematic diagram illustrating a structure of a lithium battery 30 according to an embodiment of the present invention.

Referring to FIG. 3, the lithium battery 30 includes a positive electrode 23, a negative electrode 22, and a separator 24 disposed between the positive electrode 23 and the negative electrode 22. The positive electrode 23, the negative electrode 22, and the separator 24 are wound or folded, and then accommodated in a battery case 25. Subsequently, an electrolyte is injected into the battery case 25 and the battery case 25 is sealed by a sealing member 26, thereby completing the manufacture of the lithium battery 30. The battery case 25 may have a cylindrical shape, a rectangular shape, or a thin-film shape. The lithium battery 30 may be a lithium ion battery.

The lithium battery may be suitable for use as power sources for electric vehicles requiring a high capacity, a high-power output, and high temperature operability, in addition to power sources for general mobile phones and portable computers, and may be coupled to existing internal combustion engines, fuel cells, or super-capacitors to be used in hybrid vehicles. In addition, the lithium battery may be used in other applications requiring a high-power output, a high voltage, and high temperature operability.

One or more embodiments of the present invention will now be described more fully with reference to the following examples. However, these examples are provided only for illustrative purposes and are not intended to limit the scope of the one or more embodiments of the present invention.

EXAMPLE 1

Figure 4:
FIG. 4 is a scanning electron microscopic (SEM) image of crystalline carbonaceous nano-sheets constructed in accordance with Example 1.

To prepare carbonaceous nano-sheets, first, 100 g of expanded graphite was heated at 500° for 1 hour, a gas generated therefrom was discharged through an exhaust of an oven, a resultant product obtained therefrom was dispersed in ethanol, and the dispersion was pulverized using a homogenizer at 10,000 rpm for 10 minutes. Then, a mixture obtained therefrom was further pulverized using a micro fluidizer, the pulverized mixture was filtered using a filtering device, the filtrate was washed with ethanol, and the washed filtrate was dried in an oven at 120°. As a result, crystalline carbonaceous nano-sheets were obtained. A scanning electron microscopic (SEM) image of the crystalline carbonaceous nano-sheets is shown in FIG. 4. As illustrated in FIG. 4, it was confirmed that the crystalline carbonaceous nano-sheets had basically a sheet-shaped structure.

Separately, powder-type Si particles having a size of about 100 nm were dispersed in a 20% pitch solution by sonication to form pitch coating layers on the Si particles. The resulting Si particles were mixed with the crystalline carbonaceous nano-sheets and the resultant mixture was dried, assembled and spherized to prepare a final negative active material.

The negative active material was mixed with a mixture of 23 wt % of PAI and 97 wt % of N-methyl-2-pyrrolidone as a binder (Product name: LSR7, manufactured by Hitachi Chemical) at a weight ratio of 94:6, and, for adjustment of viscosity, N-methylpyrrolidone was added to the resultant mixture until the solid content in the mixture became 60 wt % to prepare a negative active material slurry. The negative active material slurry was then coated on a copper foil current collector having a thickness of 10 μm to fabricate a negative electrode plate. Thereafter, the negative electrode plate was dried at 120° C. for 15 minutes and pressed to fabricate a negative electrode having a thickness of 60 μm. Next, the negative electrode was assembled with a Li metal as a counter electrode, a polyethylene separator having a thickness of 20 μm (Product Name: STAR20, available from Asahi), and an electrolyte to manufacture a 2016R-type coin half-cell. In this regard, the electrolyte contained a mixed solvent including ethylene carbonate (EC), ethylmethyl carbonate (EMC), and diethyl carbonate (DEC) at a volume ratio of 3:3:4 and 1.10 M of $LiPF_6$.

EXAMPLE 2

A coin cell was manufactured in the same manner as in Example 1, except that the crystalline carbonaceous nano-sheets are pitch-coated in the same manner as that used for the powder-type Si particles, instead of pitch-coating the powder-type Si particles. As a result, pitch coating layers are formed on the crystalline carbonaceous nano-sheets.

EXAMPLE 3

A coin cell was manufactured in the same manner as in Example 1, except that the crystalline carbonaceous nano-sheets were also pitch-coated in the same manner as that used for the powder-type Si particles. As a result, pitch coating layers are formed on both of the crystalline carbonaceous nano-sheets and the powder-type Si particles.

COMPARATIVE EXAMPLE 1

A coin cell was manufactured in the same manner as in Example 1, except that the powder-type Si particles were not pitch-coated.

EVALUATION EXAMPLE 1

Evaluation of Lifetime Characteristics

Figure 5:
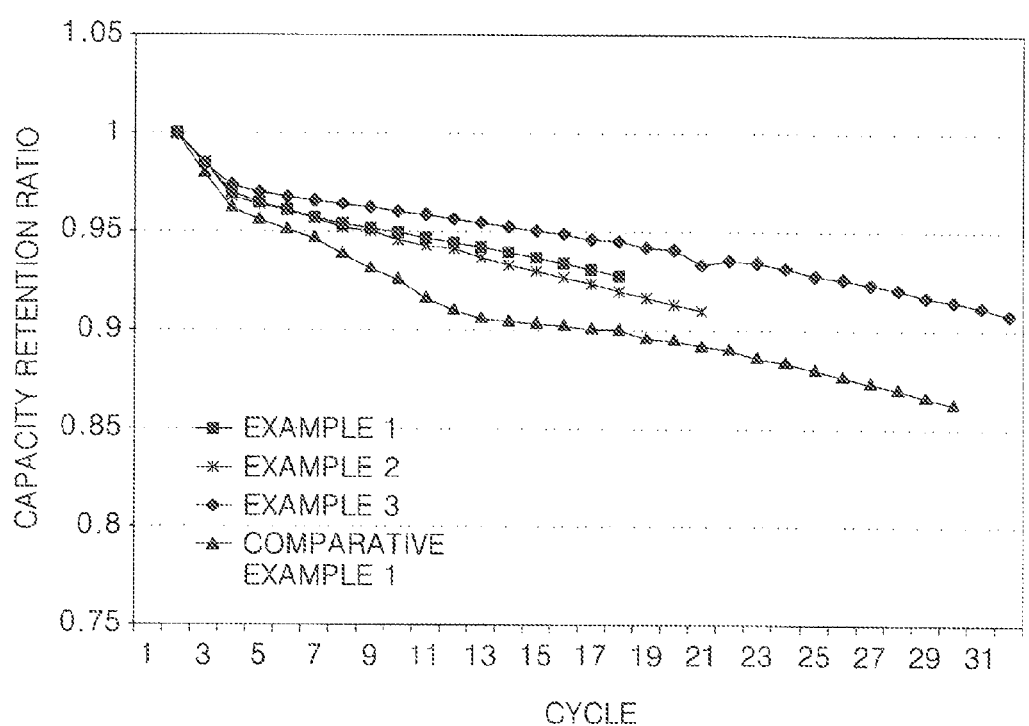
FIG. 5 is a. graph showing capacity measurement results of coin cells manufactured according to Examples 1 to 3 and Comparative Example 1, according to cycle number.

The coin cells manufactured according to Examples 1 to 3 and Comparative Example 1 were charged at a current of 10 to 20 mA per 1 g of the negative active material until the voltage thereof reached 0.001 V (with respect to Li) and then discharged at the same current until the voltage thereof reached 1.5 V (with respect to Li). Subsequently, the cycle of charging and discharging were repeated 32 times at the same current and the same voltage range. A capacity retention ratio of each coin cell according to the number of cycles was measured, and the measurement results are shown in FIG. 5. In this regard, the capacity retention ratio is defined by Equation 1 below:

Capacity retention ratio=[discharge capacity at each cycle]/[discharge capacity at $1^{st}$ cycle]   <Equation 1>

As shown in FIG. 5, the coin cells of Examples 1 to 3 exhibited a longer lifetime at $32^{nd}$ cycle than that of the coin cell of Comparative Example 1. In addition, it was confirmed that the coin cell including the powder-type Si particles and the crystalline carbonaceous nano-sheets that were both pitch-coated exhibited the longest lifetime in the coin cells of Examples 1 to 3 and Comparative Example 1.

As described above, according to the one or more of the above embodiments of the present invention, a negative active material includes an amorphous carbonaceous coating layer, thereby increasing the conductivity of lithium ions. Therefore, a lithium battery including the negative active material may have a high efficiency and a long lifetime.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:
1. A negative active material, comprising:
    a plurality of non-carbonaceous nanoparticles capable of doping or undoping lithium; and
    a plurality of crystalline carbonaceous nano-sheets,
    each of the crystalline carbonaceous nano-sheets comprising a first amorphous carbonaceous coating layer substantially covering and contacting the surface of the crystalline carbonaceous nano-sheet,
    each of the non-carbonaceous nanoparticles comprising a second amorphous carbonaceous coating layer substantially covering and contacting the surface of the non-carbonaceous nanoparticle,
    wherein the surface of each crystalline carbonaceous nano-sheet is separated from the surface of each non-carbonaceous nanoparticle by the first and second amorphous carbonaceous coating layers.
2. The negative active material of claim 1, each non-carbonaceous nanoparticle comprising a material selected from Si; $SiO_x$ where $0<x\leq2$; Si-Z alloy where Z is an alkali metal, an alkali earth metal, a Group XIII element, a Group XIV element, a transition metal, a rare-earth element, or combinations thereof and is not Si; Sn; $SnO_2$; Sn-Z where Z is an alkali metal, alkali earth metal, a Group XIII element, a Group XIV element, a transition metal, a rare-earth element, and combinations thereof and is not Sn; and combinations thereof.
3. The negative active material of claim 1, each non-carbonaceous nanoparticle having an average diameter in a range of about 1 nm to about 500 nm.
4. The negative active material of claim 1, each crystalline carbonaceous nano-sheet comprising a material selected from a polycyclic nano-sheet in which rings of carbon atoms fused to one another are arranged on a plane, a lamination of polycyclic nano-sheets, and combinations thereof.
5. The negative active material of claim 1, each crystalline carbonaceous nano-sheet having an average area in a range of about 1 μm² to about 100 μm².

6. The negative active material of claim 1, a thickness of each crystalline carbonaceous nano-sheet being in a range of about 0.1 nm to about 50 nm.

7. The negative active material of claim 1, each crystalline carbonaceous nano-sheet having a thickness of 20 nm or less and an aspect ratio of 300 or more.

8. The negative active material of claim 1, an amount of the plurality of crystalline carbonaceous nano-sheets being in a range of about 1 to about 300 parts by weight based on 100 parts by weight of the plurality of non-carbonaceous nanoparticles.

9. The negative active material of claim 1, the first amorphous carbonaceous coating layer comprising a material selected from soft carbon, hard carbon, a pitch carbide, a meso-phase pitch carbide, sintered coke, a polymer carbide, and combinations thereof.

10. The negative active material of claim 1, a thickness of the first amorphous carbonaceous coating layer being in a range of about 1 nm to about 1 μm.

11. The negative active material of claim 1, an average diameter of the negative active material being in a range of about 1 μm to about 60 μm.

12. The negative active material of claim 1 having a surface coated by a third amorphous carbonaceous coating layer.

13. The negative active material of claim 12, the third amorphous carbonaceous coating layer comprising a material selected from soft carbon, hard carbon, a pitch carbide, a meso-phase pitch carbide, sintered coke, a polymer carbide, and combinations thereof.

14. The negative active material of claim 12, a thickness of the third amorphous carbonaceous coating layer being in a range of about 1 nm to about 1μm.

15. A lithium battery comprising:
a negative electrode comprising the negative active material according to claim 1;
a positive electrode comprising a positive active material and facing the negative electrode; and
an electrolyte disposed between the negative electrode and the positive electrode.

16. The negative active material of claim 1 further comprising pores formed inside the negative active material.

17. The negative active material of claim 16, the negative active material having a porosity of more than 5% to about 30%.

* * * * *